2,856,415
3,19-DIHYDROXY-5-ANDROSTENE DERIVATIVES

Joseph S. Mihina, Skokie, Ill., assignor to G. D. Searle & Co., Chicago, Ill., a corporation of Delaware No Drawing. Application November 13, 1957
Serial No. 696,049

4 Claims. (Cl. 260—397.4)

The present invention relates to 3,19-dihydroxy-5-androsten-17-one and to intermediates for its production which can be represented by the general structural formula

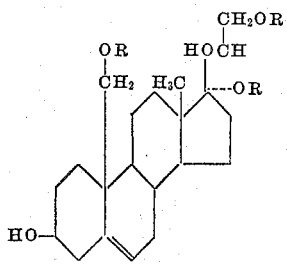

wherein R is a member of the class consisting of hydrogen and lower alkyl-CO— radicals.

In the foregoing structural formula R can be a lower alkyl radical such as methyl, ethyl, straight-chained propyl, butyl, amyl, hexyl and the like.

3,19-dihydroxy-5-androsten-17-one is a local anesthetic and mild non-narcotic sedative agent. Unlike its hypnotic $\Delta^4$-isomer it does not produce prolongation of sleeping time after barbiturate administration.

The compounds of this invention are also valuable intermediates in organic synthesis of 19-norsteroids because on treatment with strong alkali the CH$_2$OR group in the 19-position can be converted to hydrogen.

The invention is disclosed in further detail by the following examples which represent specific embodiments of this invention without, however, limiting it in spirit or in scope. Amounts of materials are given in parts by weight and temperatures are given in degrees centigrade (° C.).

Example 1

To a solution of 1 part of 17,19,21-trihydroxy-4-pregnene-3,20 dione in 10 parts of pyridine are added 2.2 parts of acetic anhydride and the solution is allowed to stand at room temperatures for 12 hours. Then there are added 18 parts of toluene and the reaction mixture is subjected to vacuum distillation. After removal of the volatile portion the crystalline residue is recrystallized from a mixture of 5 parts of ethyl acetate in 20 parts of petroleum ether to yield 17α-hydroxy-19,21-diacetoxy-4-pregnene-3,20-dione which melts at about 144–146° C. Infrared maxima are observed at 2.89, 5.76, 6.04, 7.09, 7.31, 8.09, 9.16, 9.29, 9.59, 11.09, 11.25, 11.84, 12.78 and 14.31 microns.

A mixture of 1.9 parts of this diacetate, 12 parts of acetyl chloride and 12 parts of acetic anhydride is refluxed for 100 minutes after which the solution is cooled and the solvents are removed by vacuum distillation.

To a solution of 2.37 parts of the resulting compound in 152 parts of tertiary butanol and 48 parts of water are added 2.3 parts of sodium borohydride and the solution is allowed to stand at 10° C. for 24 hours. The solution is poured with stirring into 1500 parts of cold water containing 7 parts of glacial acetic acid. It is then extracted exhaustively with dichloromethane and the extract is washed with water, dried over anhydrous sodium sulfate and concentrated under vacuum to yield 17,19,21-triacetoxy-5-pregnene-3,20-diol. The infrared absorption spectrum shows maxima at 2.95, 5.78, 6.95, 7.25, 8.05, 9.11, 9.60, 10.38, and 11.00 microns.

Example 2

A solution of 1.66 parts of 17,19,21-triacetoxy-5-pregnene-3,20-diol in 24 parts of tetrahydrofuran is treated with a solution of 0.552 part of lithium aluminum hydride in 12 parts of tetrahydrofuran. As the reaction proceeds an additional quantity of 10 parts of tetrahydrofuran is introduced and the reaction mixture is refluxed for 90 minutes. It is next chilled and treated slowly with 3-M hydrochloric acid until the solution reaches a pH of 2. The solution is then extracted with dichloromethane. The extract is washed with a small amount of water and dried over sodium sulfate. The organic solvent is removed and the residue is crystallized from a solvent containing 8 parts of benzene, 1 part of methanol and 1 part of ethyl acetate. The 5-pregnene-3,17,19,20,21-pentol thus obtained melts at about 220–222° C. Infrared maxima are observed at 3.01, 6.98, 7.14, 7.28, 7.45, 7.77, 8.18, 8.35, 8.69, 9.14, 9.55, 10.34, 10.92, 11.34, 11.92 and 12.26 microns.

Example 3

To a solution of 731 parts of 5-pregnene-3, 17, 19, 20, 21-pentol in 3600 parts of methanol are added 1200 parts of periodic acid in 10,000 parts of water. The solution is allowed to stand at room temperature for 12 hours and then diluted with 100,000 parts of water and extracted with dichloromethane. The extract is dried over anhydrous sodium sulfate and evaporated under vacuum. The residue is crystallized from a 1 to 1 mixture of ethyl acetate and petroleum ether to yield 3,19-dihydroxy-5-androsten-17-one melting at about 204–206° C. The infrared absorption spectrum shows maxima at 3.00, 5.80, 7.00, 7.12, 7.35, 7.51, 8.06, 8.10, 8.43, 8.64, 8.84, 9.08, 9.48, 9.77, 9.98, 10.39, 11.20, 11.78 and 12.60 microns.

What is claimed is:
1. 3,19-dihydroxy-5-androsten-17-one.
2. A compound of the formula

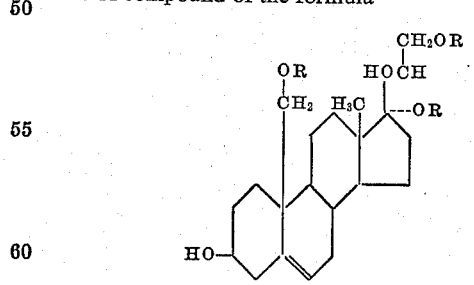

wherein R is a member of the class consisting of hydrogen and lower alkyl-CO— radicals.
3. 5-pregnene-3,17,19,20,21-pentol.
4. 17,19,21-triacetoxy-5-pregnene-3,20-diol.

No references cited.

UNITED STATES PATENT OFFICE
Certificate of Correction

Patent No. 2,856,415                         October 14, 1958

Joseph S. Mihina

It is hereby certified that error appears in the printed specification of the above numbered patent requiring correction and that the said Letters Patent should read as corrected below.

Column 1, lines 19 to 25, and column 2, lines 50 to 56, for that portion of the formula, each occurrence, reading

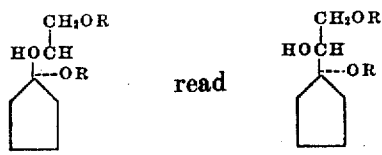

Signed and sealed this 6th day of January 1959.

[SEAL]

Attest:
KARL H. AXLINE,
*Attesting Officer.*

ROBERT C. WATSON,
*Commissioner of Patents.*